Dec. 16, 1947. W. M. SMITH 2,432,826
DIFFERENTIAL VACUUM TUBE VOLTMETER
Filed Aug. 1, 1945
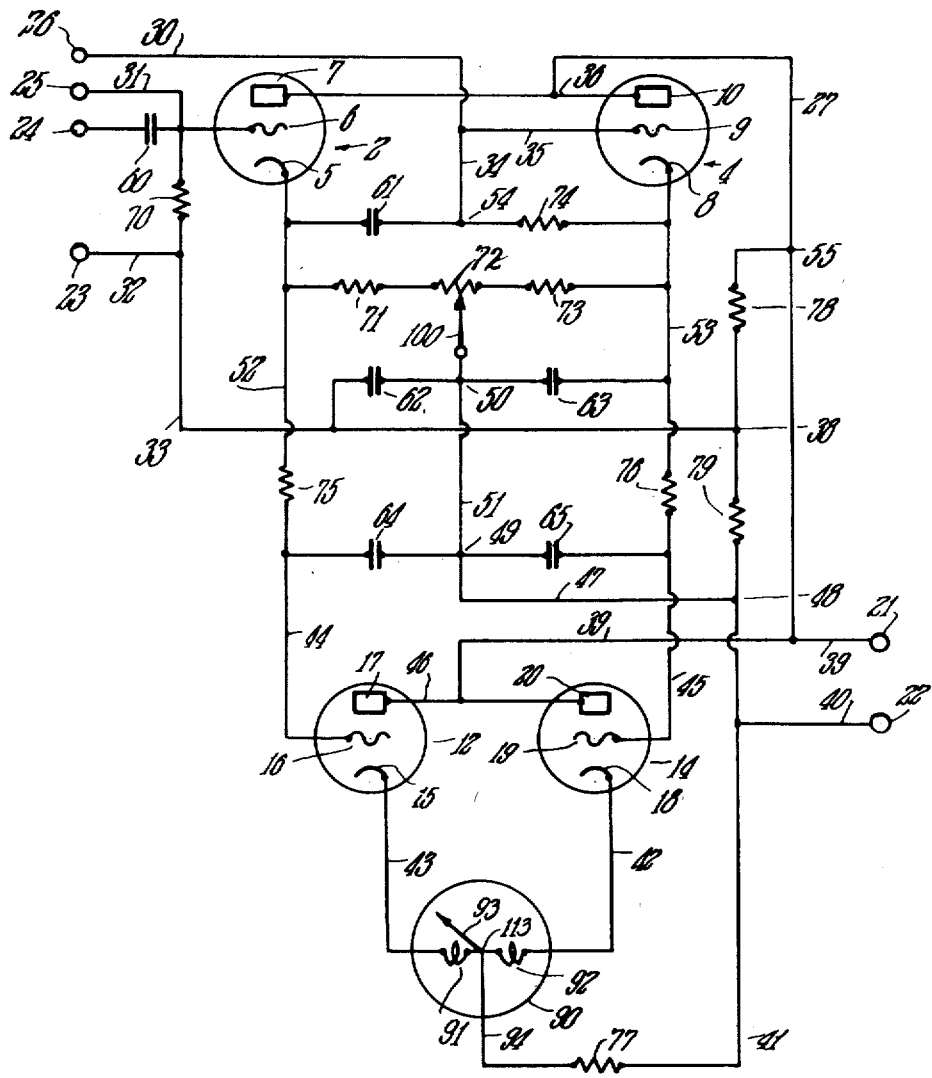
INVENTOR.
Wolcott W. Smith
BY Walter C. Ross.
Attorney Patented Dec. 16, 1947

2,432,826

UNITED STATES PATENT OFFICE 2,432,826

DIFFERENTIAL VACUUM TUBE VOLTMETER

Wolcott M. Smith, Springfield, Mass., assignor to The F. W. Sickles Company, Chicopee, Mass., a corporation of Massachusetts Application August 1, 1945, Serial No. 608,184

8 Claims. (Cl. 171—95)

1

This invention relates to improvements in electronic voltmeters and the principal objects of the invention are directed to the provision of a vacuum tube voltmeter which is stable in its operation.

According to one feature of the invention, the apparatus has high input impedance and low input capacitance characteristics and is adapted to separately indicate either on A. C. or on D. C. voltage of either positive or negative polarity.

Various novel features and advantages of the invention will be hereinafter observed in connection with the following description of the present preferred form of the invention with reference to the drawing wherein:

The figure is a wiring diagram to explain the circuits and components constituting the novelty of the invention.

Referring now to the drawings more in detail, the invention will be fully described.

Vacuum tubes 2 and 4 are provided, which have at least cathodes 5 and 8 respectively, grids 6 and 9 respectively, and plates 7 and 10 respectively. A multiplicity of elements is permissible but not essential to satisfactory operation of the apparatus.

Vacuum tubes 12 and 14 are also provided which have at least cathodes 15 and 18 respectively, grids 16 and 19 respectively, and plates 17 and 20 respectively.

Cathodes of all of said tubes will of course be heated by the usual means, well known to the art, such as filaments or the like.

A meter 90 is provided, incorporating a differential winding composed of two parts 91 and 92 and the mid point 113 which is made available for external connections.

Provision is made through terminals 21 and 22 for application of a D. C. anode supply. The value of this supply voltage will be determined by the tubes employed.

Inputs to the device, to which voltages for measurement are applied, are provided at terminals 23, 24, 25 and 26. Terminal 23 is a common terminal to which the ground or low voltage side of any circuit under investigation is to be connected. Terminal 24 is used for making A. C. voltage measurements. Terminal 25 is employed when positive D. C. voltage is to be investigated. Terminal 26 is for use when it is necessary to test negative D. C. voltage.

The plates of tubes 2, 4, 12, and 14 are connected together by means of connections 36, 27, 39 and 46. The positive anode supply is connected to 39, and thence to the tube plates, through terminal 21.

The negative D. C. test voltage terminal 26 is connected to grid 9 of tube 4 through 30 and 35. The positive D. C. voltage test terminal 25 is connected to grid of tube 2 through connection 31.

2

The A. C. test terminal 24 is connected to grid 6 of tube 2 through a condenser 60. Grid 6 of tube 2 is also connected to common terminal 23 through resistor 70 and connection 32. Cathode 5 of tube 2 is connected to grid 16 of tube 12 through connection 52, resistor 75, and connection 44 and is also connected through condenser 61 and resistor 74 to cathode 8 of tube 4. Grid 9 of tube 4 is connected to the mid-point 54 between condenser 61 and resistor 74 through connections 34 and 35. Cathode 8 of tube 4 is connected to grid 19 of tube 14 through connections 53, resistor 76, and connection 45, and is also connected to cathode 5 of tube 2, through resistor 73, potentiometer 72 and resistor 71.

Adjustable arm 100 of potentiometer 72 connects to mid-point 50 between condensers 62 and 63, thence through connection 51 to mid-point 49 between condensers 64 and 65 and thence through connection 47, tie-point 48, and connections 41 and 40 to the negative side of the anode supply terminal 22. Capacitor 62 is connected from cathode 8 of tube 4 through connection 53 to tie-point 50 and connection 51 acting as a by-pass and filter condenser. Filter condensers 64 and 65 are connected to grids 16 and 19 of tubes 12 and 14 respectively, through connections 44 and 45, respectively. Their mid-point 49 also connects to connections 51 and 47 at tie-point 49. Cathodes 15 and 18 of tubes 12 and 14 respectively connect through connections 43 and 42 respectively to coils 91 and 92 respectively of meter 90. Connection 94 of meter 90 connects through resistor 77 and connections 41 and 40 to the negative side of anode supply at terminal 22. A voltage divider, consisting of resistors 78 and 79 connected together at tie-point 38 with the latter point connected to the comon input terminal 23 through connections 33 and 32 is connected from tie-point 55 to tie-point 48 and is thereby placed across the anode supply between terminals 21 and 22 through connections 37 and 39 to the positive terminal 21 and through connections 40 and 41 to the negative terminal 22.

Resistors 70 and 74 are of relatively high value to affect circuits under test as little as possible and the various components shown and described will be calculated and selected so as to function for the purpose intended.

With the supply terminals 21 and 22 properly connected to a direct current anode supply, and a negative D. C. voltage which it is desired to test connected between terminals 26 and 23 such that the negative connection is made to terminal 26, the impressed voltage on grid 9 of tube 4 tends to reduce current flow through tube 4 thereby reducing the voltage across resistor 73 and the portion of potentiometer 72 which is to the right of the potentiometer arm 100. Reduction of voltage at cathode 8 of tube 4 is carried to grid 19 of tube 14 through connections 53, resistor 76 and connection 45. Capacitor 65 which is connected to grid 19 of tube 14 in conjunction with resistor 76 tends to prevent A. C. from appearing at grid 19 of tube 14. Since the voltage on grid 19 of tube 14 has been reduced from its original value, the plate current through tube 14 is also reduced and less current flows through cathode 18, connection 42, coil 92, connection 94 and resistor 77 than did previously. This tends to reduce the cathode voltage on tubes 12 and 14 thereby increasing the plate current flow in tube 12, which increases the cathode current through cathode 15, connection 43, coil 91 and connection 94 of meter 90, and through resistor 77, thereby tending to re-establish the voltage at both cathodes 15 and 18 of tubes 12 and 14 to their original values. This action causes pointer 93 of meter 90 to be moved since the change in current flow through coils 91 and 92 of meter 90 which is compensated in resistor 77, nevertheless continues to provide a differential action for the meter moving elements 91, 92 and 93. Thus, it is seen that the single change in voltage at grid 19 of tube 14 has caused a current change through the coil 92, which is reflected in coil 91 in such a way as to increase the movement of pointer 93 beyond that which would have occurred had a single coil been available in the meter and had a single tube, such as 14, been employed rather than the balanced arrangement of tubes 14 and 12. This provides a considerable gain in sensitivity over that provided by single tube operation.

When A. C. operation is used by connecting an alternating voltage across terminals 23 and 24, tube 2 acts in the manner of a cathode follower, such that the voltage at cathode 5 of tube 2 which is developed across resistor 71 and that portion of potentiometer 73 on the left side of arm 100, will be a satisfactory reproduction of voltage at grid 6 of tube 2. This voltage at cathode 5 of tube 2 is then coupled through condenser 61, connections 54, 34 and 35 to grid 9 of tube 4 and through condenser 61 and connection 54 to resistor 74 and thence to the cathode 8 of tube 4. This causes tube 4 to act as a grid leak detector and, without loading the circuit under test unnecessarily, develops a negative voltage on grid 9 of tube 4 which tends to reduce the current flow through tube 4. This reduces the current flow through cathode 8 of tube 4, resistor 73 and that portion of potentiometer 72 to the right of potentiometer arm 100, thereby reducing the voltage at cathode 8. The reduction in voltage is again transferred to grid 19 of tube 14 in the manner previously described so that the action of meter 90 again occurs as already described for the operation with negative D. C. input.

The positive D. C. potential to be measured is connected between terminals 25 and 23 such that the positive side of the direct current voltage is connected to terminal 25, and grid 6 of tube 2 is thereby given a positive potential in respect to common terminal 23. This action tends to increase the current flow through 72 and thence through cathode 5 of tube 2, resistor 71 and that portion of potentiometer 72 at the left of its arm 100. The increased voltage developed at cathode 5 of tube 2 is carried to grid 16 of tube 12 through connection 52, resistor 75 and connection 44. Condenser 64, which is connected to grid 16 of tube 12 through connection 44, acts as a filter unit to remove any A. C. components. The increased voltage on grid 16 of tube 12 tends to increase current flow through this tube thence through cathode 15 of tube 12, connections 43, coil 91, connection 94 and resistor 77. This action tends to increase voltage at the cathode 18 of tubes 12 and 14, thereby decreasing current flow through tube 14 and thence through its cathode 18, connection 42, coil 92, connection 94 and resistor 77 which, in turn, tends to re-establish the voltage at the two cathodes 15 and 18 to its original value. This current flow through the coils 91 and 92 moves pointer 93 to indicate a reading on the meter 90. The action is greatly amplified due to the balanced differential action of tubes 12 and 14 and the use of the differential meter 90.

A high degree of stability in this device is attained through the use of a balanced circuit arrangement throughout. Thus, tubes 2 and 4 are similar and tubes 12 and 14 are similar. Any changes in anode supply or changes in meter voltage accordingly affect meter 90 equally on either coil 91 and 92 and, therefore, tend to cancel out any such variations.

Potentiometer 72 permits setting the meter 90 to zero deflection, with no input to terminals 23, 24, 25 and 26. When terminals 25 and 26 are connected together, grids 6 and 9 of tubes 2 and 4 respectively are placed at zero potential in respect to each other. Potentiometer arm 100 is then adjusted until pointer 93 of meter 90 rests at the desired point on the dial of meter 90.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A differential vacuum tube voltmeter comprising a meter having a pair of connected windings, said meter being adapted to indicate the difference in the current flowing in each of said windings, a pair of vacuum tubes each having at least a grid, a cathode, and a plate, electrical connections between the plates of said tubes and the positive side of a suitable source of potential, electrical connections between the cathodes of said tubes and the negative side of said source of potential including a common cathode resistor, one of said meter windings being included in the connection to one of said cathodes and the other of said meter windings being included in the connection to the other of said cathodes, and circuit means for imparting the voltage to be measured to the grid of one of said tubes while maintaining the voltage of the grid of the other tube constant.

2. A differential vacuum tube voltmeter comprising a meter having a pair of windings each having a free end and an end connected to the other winding at a connection point, said meter being adapted to indicate the difference in the current flowing in each of said windings, a pair of vacuum tubes each having at least a grid, a cathode, and a plate, electrical connections directly connecting the plates of said tubes together and to the positive side of a suitable source of potential, electrical connections between each of the cathodes of said tubes and one of the free ends of said meter windings, electrical connections including a resistor between the connection point of said meter windings and the negative side of said source of potential, and circuit means for imparting the voltage to be measured to the grid of one of said tubes while maintaining the voltage of the grid of the other of said tubes constant.

3. A differential vacuum tube voltmeter comprising a meter having a pair of connected windings, said meter being adapted to indicate the difference in the current flowing in each of said windings, a first pair of vacuum tubes each having at least a grid, a cathode, and a plate, a second pair of vacuum tubes each having at least a grid, a cathode, and a plate, electrical connections between the plates of said tubes and the positive side of a source of potential, electrical connections between the cathodes of said tubes and the negative side of said source of potential, a pair of electrical connections each between one of said cathodes and the grid of one of said first pair of tubes, and connections for applying positive D. C. voltage to be measured to the grid of one of said second pair of tubes and for applying negative D. C. voltage to be measured to the grid of the other of said second pair of tubes.

4. The vacuum tube voltmeter of claim 3, in which the electrical connections between the cathodes of said second pair of tubes and the negative side of said source of potential includes a balancing potentiometer.

5. In the differential vacuum tube voltmeter of claim 3, electrical connections between the cathode of one of said second paid of tubes and the grid of the other of said second pair of tubes including a capacitor and electrical connections between said cathode and the cathode of the other of said second pair of tubes including said capacitor and a resistor, whereby alternating voltage applied to the grid of the first of said tubes develops a negative voltage on a grid to the second of said tubes proportional to the amplitude of the alternating current.

6. An electrical circuit comprising a first and second vacuum tube each having at least a cathode, a grid, and a plate, electrical connections between the plates of said tubes and the positive side of a source of potential, electrical connections between the cathodes of said tubes and the negative side of said source of potential, electrical connections between the cathode of said first tube and the grid of said second tube including a capacitor, electrical connections between the grid and cathode of said second tube including a resistor, and circuit means for applying an alternating voltage to the grid of the first of said tubes, whereby alternating voltage applied thereto develops a negative voltage on the grid of the second of said tubes proportional to the amplitude of the alternating current.

7. An electrical circuit comprising a first and second vacuum tube each having at least a cathode, a grid, and a plate, electrical connections between the plates of said tubes and the positive side of a source of potential, electrical connections between the cathodes of said tubes and the negative side of said source of potential including a balancing potentiometer, electrical connections between the cathode of said first tube and the grid of said second tube including a capacitor, electrical connections between the grid and cathode of said second tube including a resistor, and circuit means for applying an alternating voltage to the grid of the first of said tubes, whereby alternating voltage applied thereto develops a negative voltage on the grid of the second of said tubes proportional to the amplitude of the alternating current.

8. An electronic voltmeter comprising in combination two vacuum tubes having at least grids, plates, and cathodes, hereafter to be called the first tube and the second tube, two terminals for connection of a D. C. anode supply, an input connection to each of said grids of said vacuum tubes, a third input connection including a condenser to said grid of said first tube, a potentiometer having an adjustable arm, a connection from one end of said potentiometer to said cathode of said first tube, a connection from said cathode of said second tube to the second end of said potentiometer, a connection between said adjustable arm and the negative terminal for said anode supply, a connection including a condenser between said cathode of said first tube and said grid of said second tube, a connection from said grid of said first tube to said adjustable arm including a resistor, a common input terminal, a connection between said common input terminal and said adjustable arm including a capacitor, a connection between said grid and said cathode of said second tube including a resistor, a connection between said common input terminal and the positive terminal for said D. C. anode supply including a resistor, two additional vacuum tubes having at least grids, plates, and cathodes, hereafter to be called the third tube and the fourth tube, a connection including a resistor from said cathode of said first tube to said grid of said third tube, a connection between said cathode of said second tube and said grid of said fourth tube including a resistor, a connection between said cathode of said second tube and said adjustable arm including a condenser, a connection between said grid of said third tube and said adjustable arm including a condenser, a connection between said adjustable arm and said grid of said fourth tube including a condenser, a device arranged with two equal windings, an arrangement of said windings in said device such that a differential of current in said windings causes an arm on said device to be displaced, a terminal on said device connecting to one end of the first of said windings, a terminal on said device connecting to one end of the second of said windings, a common terminal on said device connecting to the second end of each of said windings, a connection between said cathode of said third tube and said first winding terminal, a connection between said cathode of said fourth tube and said second winding terminal, a connection including a resistor between said common terminal on said device and said negative terminal for said D. C. anode supply, and a connection between each said vacuum tube plate and said positive terminal for said D. C. anode supply.

WOLCOTT M. SMITH.

REFERENCES CITED

The following references are of record in the file of this patent:

UNITED STATES PATENTS

| Number | Name | Date |
| --- | --- | --- |
| 1,755,244 | Dietze | Apr. 22, 1930 |
| 2,316,044 | Blair | Apr. 6, 1943 |
| 2,356,733 | Banker | Aug. 29, 1944 |
| 2,360,523 | Simmons | Oct. 17, 1944 |